(No Model.)
J. E. BRENNEISEN.
BUTTER MOLD.
No. 496,635.
Patented May 2, 1893.
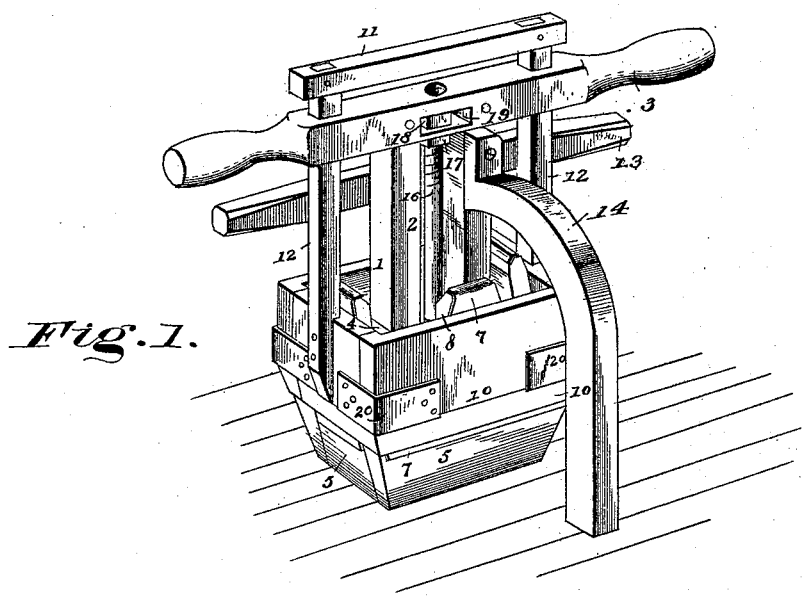
Fig. 1.
Fig. 2.
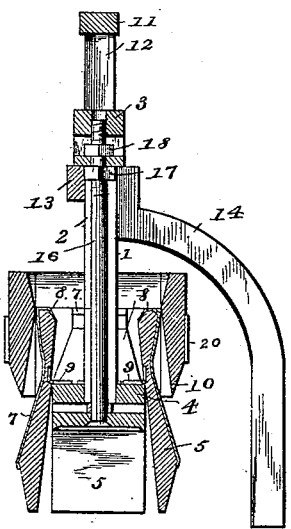
Fig. 3.
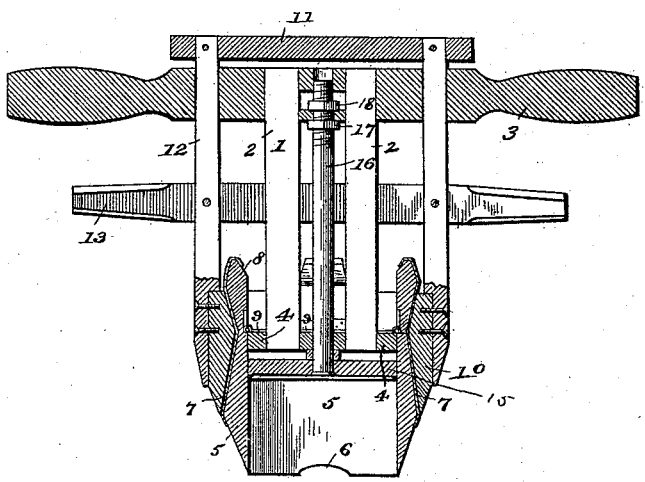
Witnesses
Inventor
John E. Brenneisen,
By his Attorneys,

UNITED STATES PATENT OFFICE.

JOHN EDWARD BRENNEISEN, OF UNIONVILLE, MARYLAND.

BUTTER-MOLD.

SPECIFICATION forming part of Letters Patent No. 496,635, dated May 2, 1893.

Application filed November 14, 1892. Serial No. 451,945. (No model.)

*To all whom it may concern:*

Be it known that I, JOHN EDWARD BRENNEISEN, a citizen of the United States, residing at Unionville, in the county of Frederick and State of Maryland, have invented a new and useful Butter-Mold, of which the following is a specification.

The invention relates to improvements in butter molds.

The object of the present invention is to provide a simple and inexpensive butter mold adapted for making butter prints rapidly, and capable of holding a print and enabling the same to be carried and deposited without liability of spoiling the shape of the print.

The invention consists in the construction and novel combination and arrangement of parts hereinafter fully described, illustrated in the accompanying drawings and pointed out in the claims hereto appended.

In the drawings—Figure 1 is a perspective view of a butter mold constructed in accordance with this invention. Fig. 2 is a central vertical sectional view. Fig. 3 is a similar view taken at right angles to Fig. 2.

Like numerals of reference indicate corresponding parts in all the figures of the drawings.

1 designates a frame composed of parallel bars 2, a horizontal handle bar 3 connecting the upper ends of the bars 2, and a horizontal block 4 secured to the lower ends of the bars and having hinged to it outwardly swinging sides 5 which when closed form a press or mold chamber or compartment adapted to be filled with butter to produce a cubical print. The lower ends of the sides are beveled to enable them to readily cut through a lump of butter to fill the mold, and one side is provided with a recess 6 through which superfluous butter is forced when the mold is full. The upper portions of the outer faces of the sides 5 are covered with sheet metal plates 7, and are provided at their upper ends with arms 8 arranged at a slight angle to the sides and connected with the block 4 by hinges 9. The sides which are wedge-shaped in vertical section are held closed to form the mold by a vertically sliding rectangular collar 10 which securely holds the sides together, and prevents them swinging outward. The farther the sliding collar is moved downward on the wedge-shaped sides, the more tightly are the latter held together. The rectangular collar is secured to a sliding frame 11 the opposite sides 12 of which are arranged in openings of the handle bar 3 and connected at their upper ends by a cross-bar, and are provided beneath the handle bar 3 with a handle 13.

The handle bar 3 is provided at each end with a handle, and the sliding frame is operated and moved up and down by the thumbs, and is within easy reach of the operator, when the latter has hold of the handles of the bar 3. An upward movement of the slotted collar forces the arms of the sides 5 inward, causing the sides to open to release the print, and the latter may be carried by the mold from the butter being molded to the paper for receiving the butter.

The butter mold is provided with a curved support 14 having its upper end pivoted to one of the bars 2 of the main frame, and adapted to be swung up out of the way while the butter is being molded, and designed to be turned down to form a rest, and to serve as a guide for the operator in depositing the print to enable such deposit to be made with precision and accuracy, and to avoid any liability of the mold being too high and allowing the print to fall with sufficient force to injure the shape.

In order to enable the mold to make prints of different sizes an adjustable rectangular head 15 is arranged within the side and is attached to the lower end of a rod 16, which has its upper end threaded and provided with nuts 17 and 18 adjustably securing the rod to the handle bar 3. The handle bar is provided with a vertical opening to receive the rod and with a horizontal recess 19 in which is arranged the nut 18. The head 15 may be adjusted vertically to vary the size of the prints, and its lower face is designed to be provided with suitable letters indicating the brand of the butter.

The rectangular collar or band 10 is provided at the corners with angle braces 20 constructed of metal, and increasing the strength of the band.

The pivoted rest 14 when in a vertical position extends below the sides to support the mold at an elevated position to limit the fall of the print as above explained.

It will be seen that the butter mold is simple and comparatively inexpensive in construction, that it enables butter to be rapidly molded into prints, and that it facilitates the handling of prints of butter.

I desire it to be understood that changes in the form, proportion and the minor details of construction may be resorted to without departing from the principle or sacrificing any of the advantages of this invention.

What I claim is—

1. In a butter mold, the combination of a frame provided at its lower end with a block, the outwardly swinging sides wedge-shaped in vertical section hinged to the block and forming a mold, and provided at their upper ends with arms extending outward at an angle, and a collar slidingly mounted on the sides and arms and surrounding the same, substantially as described.

2. In a butter mold, the combination of a frame provided at its lower end with a block, outwardly swinging sides hinged to the block and provided with upwardly extending arms arranged at an angle to the sides, and a sliding collar surrounding the sides and adapted to be moved downward to secure the sides together and capable of vertical movement to engage the arms to force the sides outward, substantially as described.

3. In a butter-mold, the combination of a frame provided at its lower end with a block and having a handle bar at its upper end, outwardly swinging sides hinged to the block and forming a mold and provided with upwardly extending arms, a collar slidingly mounted on and surrounding the sides, and a sliding frame mounted on the handle bar and connected with the collar and provided with a handle, substantially as described.

4. In a butter-mold, the combination of a main frame provided at its lower end with a block, outwardly swinging sides hinged to the block and forming a mold, a sliding collar surrounding the sides, and a rest pivoted to the frame and extending below the sides and adapted to be turned up out of the way, substantially as described.

5. In a butter mold, the combination of a frame, having a block at its lower end, outwardly swinging sides hinged to the block and forming a mold, one of the sides provided with a recess at its lower edge to permit the escape of superfluous material, and a sliding collar surrounding the sides, substantially as described.

6. In a butter mold, the combination of a frame provided at its lower end with a block, outwardly swinging sides hinged to the block and forming a mold, and an adjustable head arranged within the sides to vary the size of the mold, and the sliding collar surrounding the sides, substantially as described.

7. In a butter mold, the combination of a frame provided at its lower end with a block, outwardly swinging sides hinged to the block and forming a mold, an adjustable head arranged within the sides, a rod having its lower end secured to the head and having its upper end threaded, and nuts arranged on the threaded end of the rod and adjustably securing the same to the frame, substantially as described.

In testimony that I claim the foregoing as my own I have hereto affixed my signature in the presence of two witnesses.

JOHN EDWARD BRENNEISEN.

Witnesses:
   H. C. WORMAN,
   E. E. HAM.